(12) United States Patent
Burdick (10) Patent No.: US 9,074,445 B2
(45) Date of Patent: Jul. 7, 2015

(54) DC POWERED SUBSEA INVERTER

(75) Inventor: John F. Burdick, Friendswood, TX (US)

(73) Assignee: OneSubsea IP UK Limited, London (GB)

( * ) Notice: Subject to any disclaimer, the term of this patent is extended or adjusted under 35 U.S.C. 154(b) by 823 days.

(21) Appl. No.: 13/143,924

(22) PCT Filed: Feb. 16, 2010

(86) PCT No.: PCT/US2010/024337
§ 371 (c)(1),
(2), (4) Date: Jul. 8, 2011

(87) PCT Pub. No.: WO2010/110952
PCT Pub. Date: Sep. 30, 2010

(65) Prior Publication Data
US 2012/0001482 A1      Jan. 5, 2012

Related U.S. Application Data

(60) Provisional application No. 61/164,304, filed on Mar. 27, 2009.

(51) Int. Cl.
E21B 33/035 (2006.01)
H02M 7/00 (2006.01)

(52) U.S. Cl.
CPC .............. *E21B 33/035* (2013.01); *H02M 7/003* (2013.01)

(58) Field of Classification Search
CPC .................................................... E21B 33/035
USPC ......................................................... 307/9.1
See application file for complete search history.

(56) References Cited

U.S. PATENT DOCUMENTS

| | | | |
|---|---|---|---|
| 1,852,560 | A | 4/1932 | Giese, Jr. |
| 1,852,562 | A | 4/1932 | Giese, Jr. |
| 3,261,591 | A | 7/1966 | Campbell et al. |
| 4,119,016 | A | 10/1978 | Pfeil et al. |
| 4,222,725 | A | 9/1980 | Rodgers, Jr. |
| 4,276,003 | A | 6/1981 | Perkins et al. |

(Continued)

FOREIGN PATENT DOCUMENTS

| | | |
|---|---|---|
| DE | 2038369 | 6/1971 |
| DE | 2011402 | 9/1971 |

(Continued)

OTHER PUBLICATIONS

International Search Report for Appl. No. PCT/EP2004/007948 dated Feb. 12, 2004.

(Continued)

*Primary Examiner* — Rexford Barnie
*Assistant Examiner* — Daniel Kessie
(74) *Attorney, Agent, or Firm* — Fletcher Yoder P.C.

(57) ABSTRACT

There is provided a system and method for driving AC powered subsea loads. Disclosed embodiments include a system having a rectifier and DC filter configured to be located at a surface vessel and configured to convert AC power supplied by a surface AC power source into DC power. The DC power is transmitted from the surface vessel to an inverter configured to be located remotely from the surface vessel at a subsea location. The subsea inverter converts the transmitted DC power back into AC power, which may then be utilized for driving one or more AC powered subsea loads.

15 Claims, 7 Drawing Sheets

(56) References Cited

U.S. PATENT DOCUMENTS

| | | | |
|---|---|---|---|
| 4,398,110 | A | 8/1983 | Flinchbaugh et al. |
| 4,442,395 | A | 4/1984 | Salina et al. |
| 4,463,814 | A | 8/1984 | Horstmeyer et al. |
| 4,862,911 | A | 9/1989 | Yie |
| 5,193,985 | A | 3/1993 | Escue et al. |
| 5,358,035 | A | 10/1994 | Grudzinski |
| 6,045,333 | A * | 4/2000 | Breit ................... 417/44.1 |
| 6,208,923 | B1 | 3/2001 | Hommel |
| 6,803,677 | B2 * | 10/2004 | Algrain et al. ............ 307/44 |
| 7,011,152 | B2 * | 3/2006 | Soelvik ................. 166/65.1 |
| 7,135,827 | B1 * | 11/2006 | Lampson ................ 318/135 |
| 8,373,314 | B2 * | 2/2013 | Biester .................. 307/147 |
| 8,456,116 | B2 * | 6/2013 | Burdick ............... 318/400.3 |
| 2002/0108747 | A1 | 8/2002 | Dietz et al. |
| 2003/0102720 | A1 * | 6/2003 | Baggs et al. ............. 307/149 |
| 2005/0029476 | A1 | 2/2005 | Biester et al. |

FOREIGN PATENT DOCUMENTS

| | | |
|---|---|---|
| DE | 19880317 C2 | 6/1999 |
| DE | 19955080 A1 | 5/2001 |
| EP | 0433649 A1 | 6/1991 |
| EP | 0911483 A2 | 4/1999 |
| EP | 1316672 A1 | 6/2003 |
| WO | 9508860 A1 | 3/1995 |
| WO | 0165061 A1 | 9/2001 |
| WO | 2005111484 A2 | 11/2005 |

OTHER PUBLICATIONS

Examination Report for Appl. No. GB0603045.6 dated Jun. 26, 2006.
International Search Report and Written Opinion for Appl. No. PCT/US2010/024337 dated Sep. 17, 2010.

* cited by examiner

DC POWERED SUBSEA INVERTER

CROSS-REFERENCE TO RELATED APPLICATIONS

This application claims priority to and benefit of PCT Patent Application No. PCT/US2010/024337, entitled "DC Powered Subsea Inverter," filed Feb. 16, 2010, which is herein incorporated by reference in its entirety, and which claims priority to and benefit of U.S. Provisional Patent Application No. 61/164,304, entitled "DC Powered Subsea Inverter", filed on Mar. 27, 2009, which is herein incorporated by reference in its entirety.

FIELD OF THE INVENTION

The present invention relates generally to subsea production systems. More particularly, the present invention relates to a variable frequency drive configuration that may be utilized in a subsea production system.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are a common source of fuel for a variety of applications, such as to heat homes, to power vehicles, and to generate electrical power, to name just a few. Once a desired resource is discovered below the surface of the earth, drilling and production systems are typically employed to access, extract, and otherwise harvest the desired resource. These systems may be located onshore or offshore depending on the location of the desired resource. When a resource is located offshore (e.g., below a body of water), a subsea production system may be utilized to extract the resource. Such subsea production systems may include components located on a surface vessel, such as a rig or platform, as well as components located remotely from the surface vessel at a subsea location, typically at or near a subterranean formation (e.g., a well) at which the resource is located. For example, a subsea production system may utilize one or more subsea wellhead assemblies and Christmas trees for controlling the flow of a resource into or out of a well.

Additionally, a subsea production system may utilize one or more subsea loads driven by AC power, such as a pump, a motor, or a compressor, for facilitating the extraction of resources from the well. For instance, as a resource is gradually extracted from a well over time, the innate pressure within the well may decrease. Thus, at some point during the life of the well, a subsea pump may be utilized to facilitate extraction of the resource from the well to the surface vessel. Such subsea loads (e.g., pumps, compressors, and motors) are generally powered using AC power, typically on the order of hundreds of kilowatts or even megawatts, supplied by an AC power supply located on the surface vessel. Typically, a variable frequency drive may be provided in conjunction with the AC power supply to provide for operation of subsea loads at variable speeds. For example, variable frequency drive may include an inverter that provides AC power to the subsea load at controllable frequencies, thus providing for adjustable control of the subsea load. As can be appreciated, this may allow for subsea pumps and compressors to be started at lower frequencies and then gradually ramped up to a desired operating speed.

In conventional subsea production systems, the variable frequency drive is typically located either on the surface vessel (in the general proximity of the surface AC power supply) or subsea (in the general proximity of the subsea load). For instance, when a subsea load is located relatively close to a surface vessel (e.g., approximately 15 kilometers or less), the variable frequency drive may be located on the surface vessel, generally in close proximity to an AC power supply. In operation, the AC power output provided by the surface variable frequency drive is transmitted to a subsea load using one or more power conductors enclosed within an umbilical. By way of example, where three-phase AC power is being transmitted from the surface variable frequency drive to the subsea load, the umbilical may include three AC power lines for transmitting the three-phase AC power (e.g., including 15 Hz, 30 Hz, and 60 Hz AC power).

When the subsea load is located farther away from the surface vessel (e.g., greater than 15 kilometers), it may not be desirable to have the variable frequency drive located on the surface vessel, due at least partially to undesirable harmonics and reflective waveforms that may result due to the nature of transmitting AC power over long distances. In such applications, it may be practical to utilize a variable frequency drive that is located subsea and away from the surface vessel (e.g., located generally in the proximity of the subsea load). In this configuration, AC power from an AC power supply on the surface vessel may be transmitted using the above-mentioned umbilical to the subsea variable frequency drive to provide power for driving the subsea load at variable speeds.

Unfortunately, the transmission of AC power, particularly over long step-out distances, is not always efficient. In an effort to increase the efficiency of AC power transmission, one technique that has been utilized is to raise the AC voltage being transmitted via an AC power conductor using subsea and/or surface transformer components. However, such components are generally costly and may add to the overall costs of resource extraction. Another technique that has been utilized for improving AC power transmission efficiency is to transmit lower frequency AC power. However, even using such measures, the transmission of AC power at a relatively low frequency of 15 Hz may still result in a decrease of over 20% efficiency at a step-out distance of approximately 200 kilometers. Additionally, the relatively high cost of providing an umbilical having sufficient core size to transmit AC power (particularly multi-phase AC power) over long distances is often burdensome and adds to the overall cost of resource extraction. Further, the transmission of AC power over long distances may additionally result in potentially undesirable harmonics and reflective waveforms being generated near sensitive subsea electronic equipment. Still further, in applications where a variable frequency drive is located subsea for the operation of AC powered subsea loads, the servicing, repair, and/or maintenance of the variable frequency drive may be impractical and/or difficult.

In light of the above-mentioned drawbacks, among others, it may be desirable to provide a more efficient technique for powering and controlling AC powered subsea loads.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components.

Certain exemplary embodiments of the present invention include systems and methods for driving AC powered subsea loads, such as a pump, motor, compressor, or some combination thereof. In particular, certain embodiments provide for a "split" variable frequency drive which may include a rectifier and DC filtering component located at a surface vessel of an offshore subsea production system and an inverter located remotely at a subsea location, e.g., near an AC powered subsea load. In operation, an AC power source located on the surface of the subsea production system supplies AC power to the rectifier. The rectifier converts the AC power into DC power, which is then filtered by the DC filter. The filtered DC power is then transmitted from the surface vessel to the subsea inverter by way of a DC power line enclosed within a subsea umbilical cable. The subsea inverter converts the transmitted DC power back into AC power, which is then utilized for driving the subsea load. In certain embodiments, the subsea inverter may be coupled to a cathode defining a seawater current return path to an anode coupled to the surface components of the split variable frequency drive.

Figure 1:
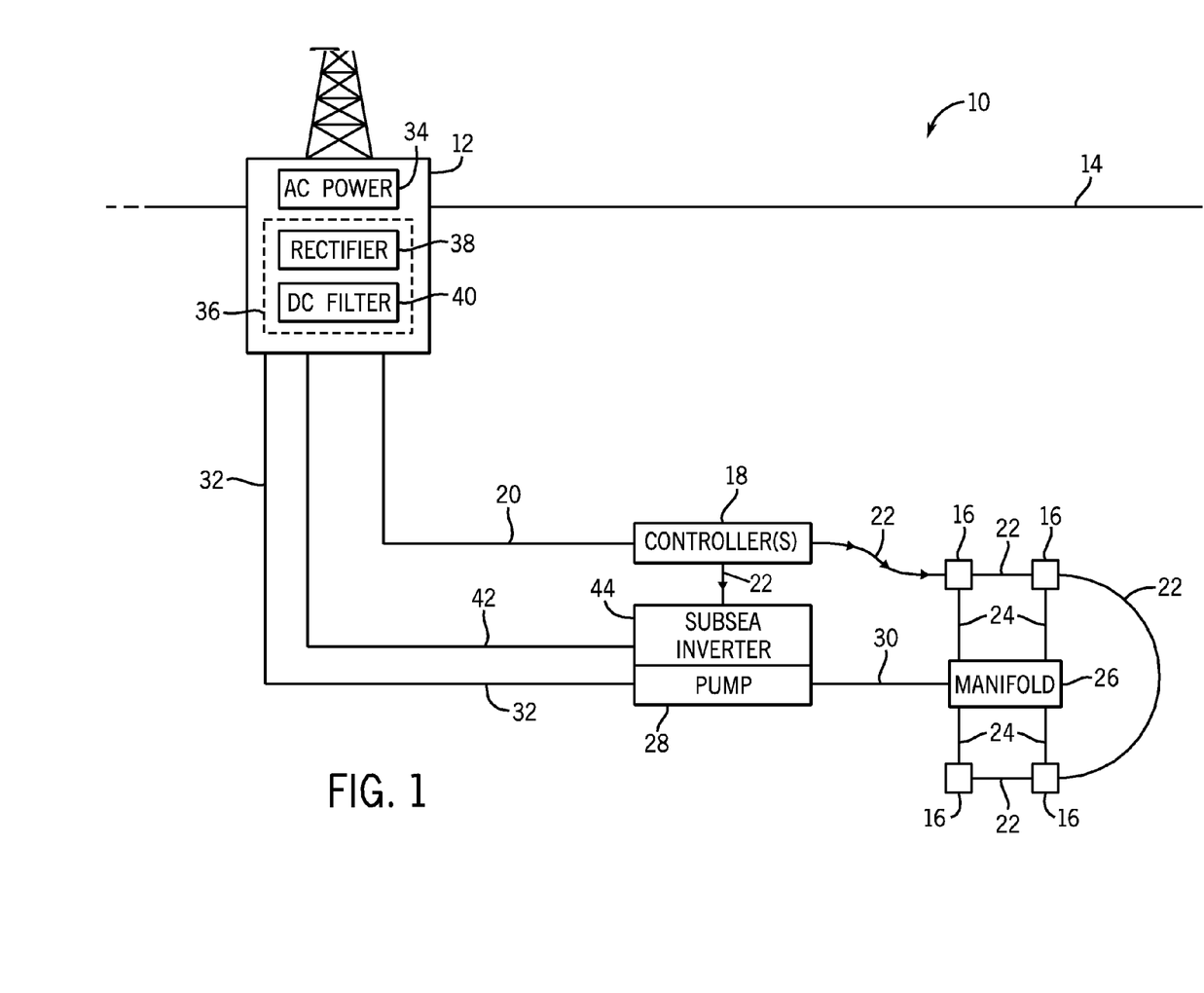
FIG. 1 is a simplified block diagram of a subsea production system, in accordance with an embodiment of the present invention.

Referring initially to FIG. 1, an exemplary subsea production system is illustrated in accordance with an embodiment of the present invention and generally referred to by reference number 10. The subsea production system 10 may be a mineral extraction system located at an offshore location and may include a surface vessel 12, which may be a rig or platform generally located at the surface 14 of the offshore location. The subsea production system 10 may include a number of subterranean formation or wells disposed below the earth at the offshore location. It should be appreciated, that in the context of subsea extraction of resources, such wells may be located at a depth or distance, commonly referred to as a "step-out distance," from the surface vessel 12.

Each well may include a wellhead (not shown), each of which may be controlled by a respective Christmas tree 16. The trees 16 generally control the production of a resource, such as a hydrocarbon resource (e.g., oil, gas, etc.) from a well. In the depicted embodiment, the trees 16 may be controlled by a controller 18, which may receive control signals from the surface vessel 12 by way of a control line 20. For example, the controller 18 may be operated remotely by an operator on the surface vessel 12. The control signals, once received by the controller 18, may be communicated to the trees 16 in the form of control actions 22.

Each of the trees 16 may include production outlets 24 that provide a path by which production fluids extracted from a well may flow to a common manifold 26. An AC-powered subsea pump 28 may be utilized to facilitate the flow of production fluids received at the manifold 26 to the surface vessel 12. For instance, in the presently illustrated embodiment, the subsea pump 28 may receive production fluids from the manifold 26 by way of the piping element 30, and further pump the received fluids to the surface vessel 12 by way of various casing and/or rising structures, depicted here by the reference number 32.

In accordance with aspects of the present technique, the subsea pump 28 may be operated using a "split" variable frequency drive that includes components located on the surface 14 (surface components 36), as well as components located subsea. The surface components 36 of the variable frequency drive may include a rectifier 38 and a DC filter 40. The rectifier 38 may receive AC power from an AC power source 34, also located on the surface vessel 12. For example, the AC power source 34 may function as a primary power source for the surface vessel 12. In operation, the rectifier 38 converts the received AC power into DC power. Additionally, by way of example, the rectifier 38 may include one or more diodes, insulated gate bipolar transistors (IGBTs), or thyristors (also referred to as silicon controlled rectifiers (SCRs)), or other suitable types of transistors. The DC power output from the rectifier 38 is then filtered using the DC filter 40. This may function to smooth the DC power prior to transmission of the DC power, thus providing for a cleaner AC power output waveform to a subsea load 28.

The subsea component of the "split" variable frequency drive includes an inverter 44. That is, the inverter component 44 of the depicted variable frequency drive is located remotely from the surface components 36 (rectifier 38 and DC filter 40). The filtered DC power may be transmitted from the surface components 36 to the subsea inverter 44 by way of a DC conductor disposed within an umbilical cable 42. The subsea inverter 44, upon receiving the DC power transmitted via the umbilical 42, converts the transmitted DC power back into AC power, which may be used to drive the subsea pump 28. In practice, the subsea inverter 44 may be controlled by the controller 18 (by way of control signals 22) such that the resulting AC power supplied to the subsea pump 28 is controllable. That is, the operation of the subsea pump 28 may be regulated by controlling the frequency and/or voltage of the electrical power supplied by the inverter 44.

Figure 2:
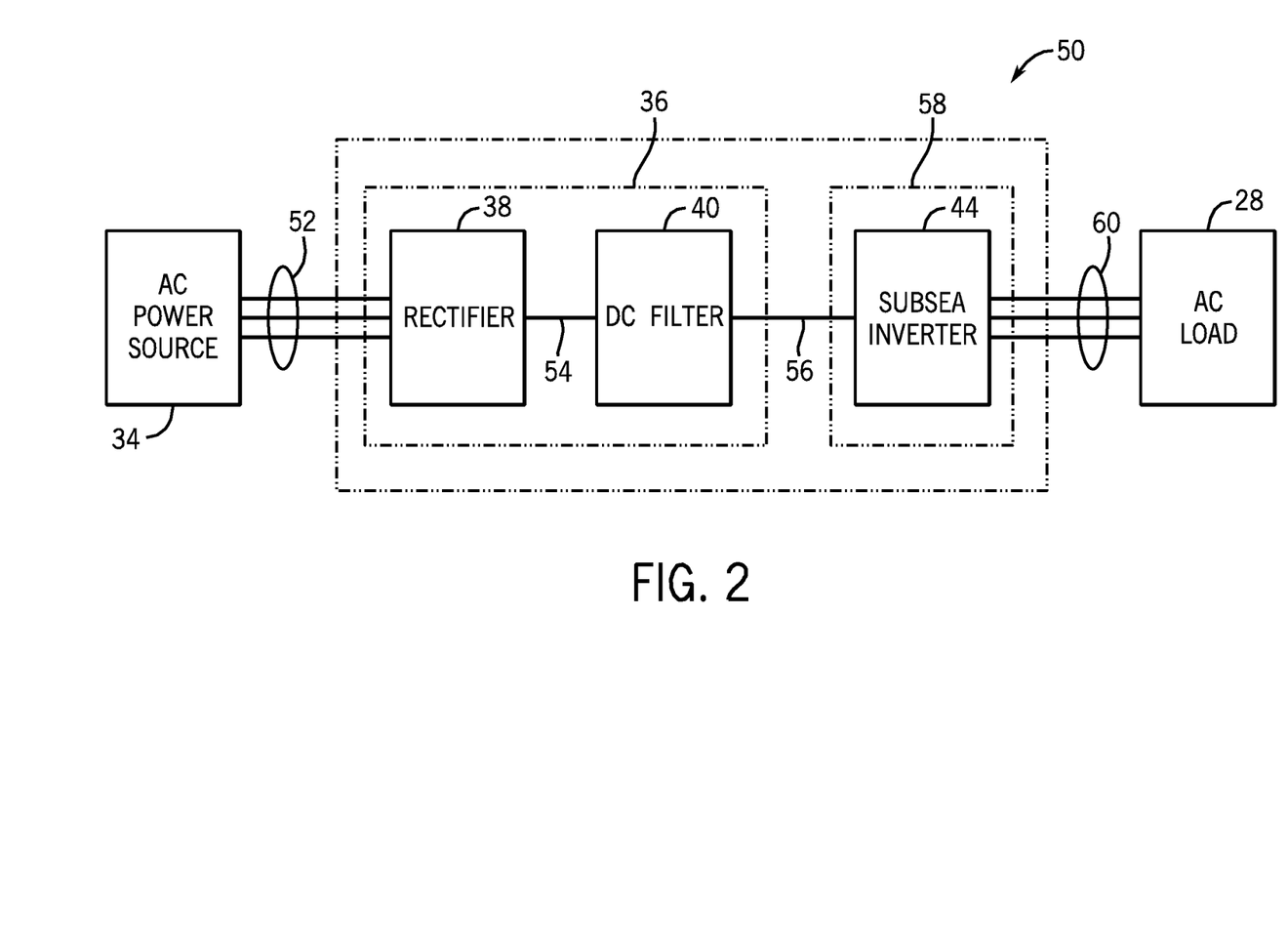
FIG. 2 is a simplified block diagram of a variable frequency drive that may be implemented in the subsea production system of FIG. 1.

Continuing now to FIG. 2, a simplified schematic representation of a variable frequency drive that may be implemented in the subsea production system 10 shown in FIG. 1 is illustrated and generally referred to by the reference number 50. As mentioned above, the variable frequency drive 50 may include the surface components 36 and the subsea inverter 44. The surface components 36 may be generally located at the surface vessel 12, and may include the rectifier 38 and the DC filter 40. The rectifier 38 may receive AC power from an AC power source 34 also located on the surface vessel 12. In the illustrated embodiment, AC power 52 supplied by the AC power source 34 may be three-phase AC power. In additional embodiments, however, the AC power source 34 may supply single-phase AC power.

The rectifier 38 converts the AC power 52 supplied by the AC power source 34 into DC power, as indicated by the reference number 54. As will be appreciated, the rectifier 38 may include one or a number of diodes, IGBTs, or thyristors, suitably arranged for converting AC power into DC power. By way of example, in one embodiment, the rectifier 38 may include six diodes arranged in an electrical bridge configuration for converting three-phase AC power into DC power. The rectified DC power 54 may then be filtered by the DC filter 40. As explained above, the process of filtering may smooth the DC power 54, which may provide a cleaner AC power output (e.g., 60) from the variable frequency drive 50.

The filtered DC power is then transmitted from the surface vessel 12 to the subsea inverter 44. The transmission of the DC power may be facilitated by a DC power line, depicted here by the reference number 56. The DC power line may be contained within the umbilical 42 shown in FIG. 1. Thus, when compared to conventional subsea production systems in which the transmission of AC power, particularly three-phase AC power (e.g., from a surface AC power supply to a subsea variable frequency drive or from a surface variable frequency drive to a subsea load), requires an umbilical having three separate AC power lines, the presently illustrated embodiment may adequately power a subsea load using an umbilical 42 that includes only a single DC power line 56.

Additionally, as will be described in further detail below, a DC power line is typically smaller in a diameter compared to an AC power conductor rated for transmitting a comparable voltage. By way of example only, a conventional AC power line for transmitting approximately 10 kilovolts (kV) to drive a subsea pump 28 may be approximately 1 to 1.5 inches in diameter. The AC power line may further require insulation (e.g., approximately 1 inch of insulating material surrounding each power line), particularly where multiple conductors are disposed within an umbilical arrangement. To transmit three-phase AC power, an umbilical having three such AC power lines, each having a respective insulating covering is required. Thus, the diameter of a conventional umbilical for transmitting three-phase AC power, when taking into account an outer insulating covering that surrounds the three AC power lines and their respective insulting layers, may be as much as or greater than 12 inches in diameter.

In contrast, an umbilical 42, in accordance with aspects of the presently described embodiments, may supply DC power to a subsea inverter 42 using a single DC power line. Typically, a DC power line suited for transmitting a particular voltage is smaller than an AC power line rated for the same voltage. By way of example only, a DC power line (e.g., 56) for transmitting approximately 10 kV may be approximately 0.5 to 0.75 inches in diameter and may also require less insulation relative to a comparable AC power line. In other words, the umbilical 42 is both smaller and less complex than a comparable umbilical utilized in conventional subsea production systems for transmitting AC power. As will be appreciated, this streamlined approach may provide for a more cost-efficient umbilical 42, thereby decreasing the overall material and production costs of powering a subsea load 28. Further, the umbilical 42, when compared to conventional AC power umbilicals, may generally be smaller and lighter, thus requiring less structured support to hold the DC power line. As will be appreciated, this may induce less stress on a surface vessel. Further, because of the generally smaller size of the umbilical 42, less space consumption is required during transport and before deployment.

With reference again to the subsea inverter 44 shown in FIG. 2, upon receiving the DC power transmitted via the DC power line 56 (within umbilical 42), the subsea inverter 44 converts the DC power back into three-phase AC power 60, which may then be used to drive the AC powered subsea load 28. While the AC powered subsea load 28 depicted in the present embodiment may be a subsea pump, it should be appreciated that a variety of subsea loads may be driven using the illustrated variable frequency drive. By way of example, the subsea load may also be an induction motor, a compressor, a raw seawater injection pump motor, a separation system pump motor, and so forth. Additionally, the disclosed embodiments of the variable frequency drive may be used to control a number of electrically actuated components (e.g., to control the opening and closing of actuators and valves and other components) in various types of equipment, including subsea trees (e.g., 16), manifolds, motors, pumps, and so forth.

Additionally, the subsea inverter 44 may be disposed in a subsea enclosure 58 that may serve to shield the inverter 44 from the subsea environment. The subsea enclosure 58, in certain embodiments, may include an interface by which the subsea inverter 44 and its corresponding enclosure 58 may be retrieved from a subsea location for service, maintenance, and/or repair. Compared to conventional subsea production systems, in which the components of a variable frequency drive (rectifier, DC filter, and inverter) are located either entirely subsea or entirely on the surface, the disclosed embodiments position only the inverter 44 subsea. As will be appreciated, this reduces the number of electronic components, and thus the overall size of the portion of the variable frequency drive 50 that is located subsea. By way of example, one disclosed embodiment may provide for at least a 66% reduction in the overall size of the subsea portion of a variable frequency drive (e.g., only the inverter 44). Other embodiments may provide at least a 50%, 60%, 70%, or 80% size reduction with respect to the subsea portion of a variable frequency drive.

Figure 3:
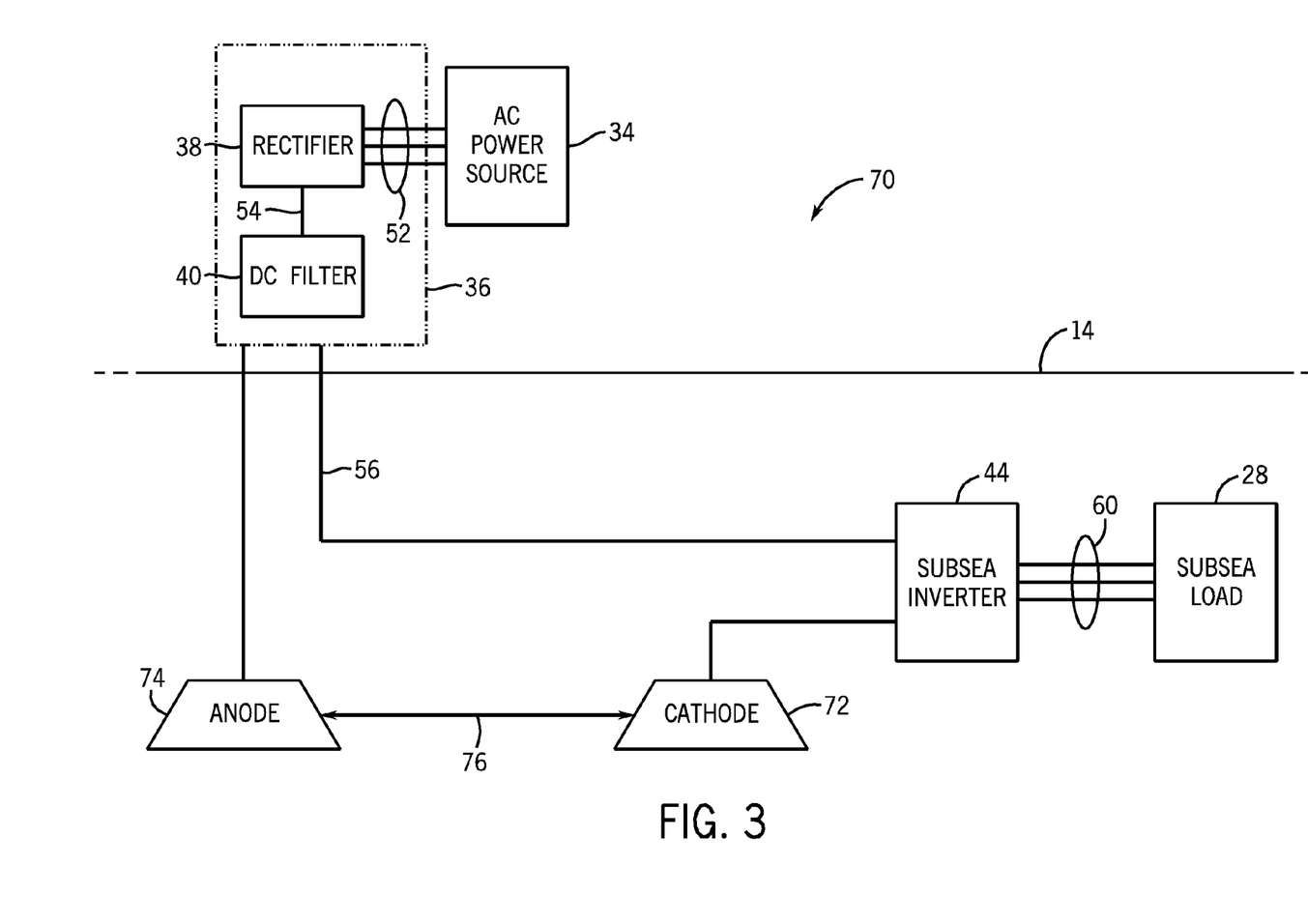
FIG. 3 is a schematic diagram of a circuit for driving an AC powered subsea load, in accordance with an embodiment of the present invention.

Turning now to FIG. 3, a schematic diagram of a circuit 70 for driving a subsea load 28 is illustrated in accordance with aspects of the present disclosure. As shown, the circuit 70 may include the AC power source 34, the variable frequency drive 50 (including the surface components 36 and the subsea inverter 44) discussed above in FIG. 2. As explained above, the AC power source 34 may supply three-phase AC power 52 to the surface components 36 of the variable frequency drive 50. The surface components 36, which may generally be located at the surface 14 of a subsea production system 10, include the rectifier 38 and the DC filter 40. The rectifier 38 may convert the AC power 52 supplied by the AC power source 34 into DC power 54. The DC power 54 output from the rectifier 38 is then filtered by the DC filter 40 in order to smooth the DC power prior to transmission to the subsea inverter 44 by way of the DC power line 56.

The DC power line 56 may include a single DC conductor for transmitting the filtered DC power to the subsea inverter 44. In the context of a subsea production system the DC power line 56 may be enclosed within an umbilical 42 (as shown in FIG. 1) coupling the surface components 36 to the subsea inverter 44. The umbilical 42 may provide insulation and shielding for the DC power line 56. In the presently illustrated embodiment, an umbilical 42 may include a single DC conductor for driving a subsea load. In additional embodiments, as will be described in further detail below, an umbilical 42 may include a single DC power line for driving multiple loads, or may include multiple DC power lines for driving multiple loads, wherein each DC power line drives a respective load. The DC power line 56 may be configured to transmit a suitable amount of voltage for driving the load 28. By way of example only, in one embodiment, the DC power line 56 may transmit a voltage of approximately 7 to 10 kilovolts. In additional embodiments, the DC power line 56 may transmit voltages from 1 to 10 kilovolts. In yet further embodiments, the DC power line 56 may transmit voltages greater than 10 kilovolts.

The subsea inverter 44 may convert DC power received via the DC power line 56 back into AC power that may be used to drive the subsea AC load 28. For example, in the illustrated circuit 70, the subsea inverter 44 converts the DC power transmitted via the DC power line 56 into three-phase AC power 60, which may be used to drive the subsea load 28, which may be a pump, motor, or compressor, as discussed above. In one embodiment, the subsea inverter 44 may be configured to provide AC power within a range of approximately 2 to 4 megawatts. In additional embodiments, the subsea inverter may provide AC power within a range of approximately 1 to 5 megawatts.

Additionally, in the depicted embodiment, the circuit 70 may include a current return path through seawater. For example, the subsea inverter 44 may be electronically coupled to a cathode 72, and the surface components 36 located on the surface vessel 12 may be electronically coupled to an anode 74. The cathode 72 and anode 74 may define a subsea current return path through the seawater, shown here by the reference number 76. Additionally, it should be understood that the subsea inverter 44 may provide three-phase AC power 60 to the subsea load 28 at controllable frequencies based upon control actions provided by the controller 18 discussed above with reference to FIG. 1. For example, where the subsea load 28 is a three-phase induction motor, the motor may be started slowly and gradually ramped up to a desired operational speed. As will be appreciated, this may allow the subsea load 28 to begin running at a full rated torque without an excessive influx of current.

Figure 4A:
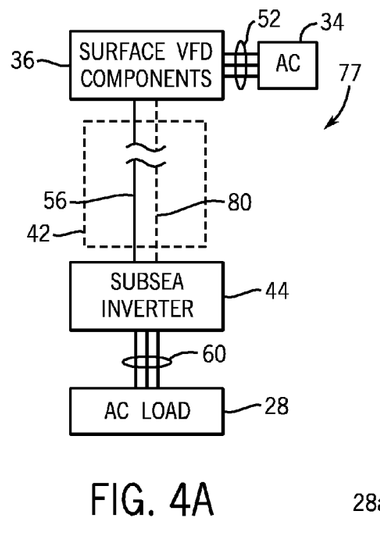
FIGS. 4A-4C depict simplified schematic diagrams of circuits for driving one or more AC powered subsea loads, in accordance with further embodiments of the present invention.
Figure 4B:
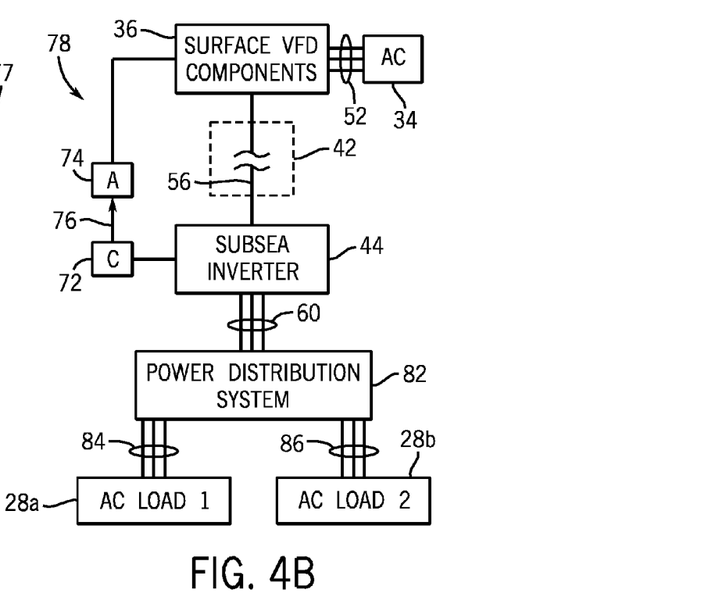
Figure 4C:
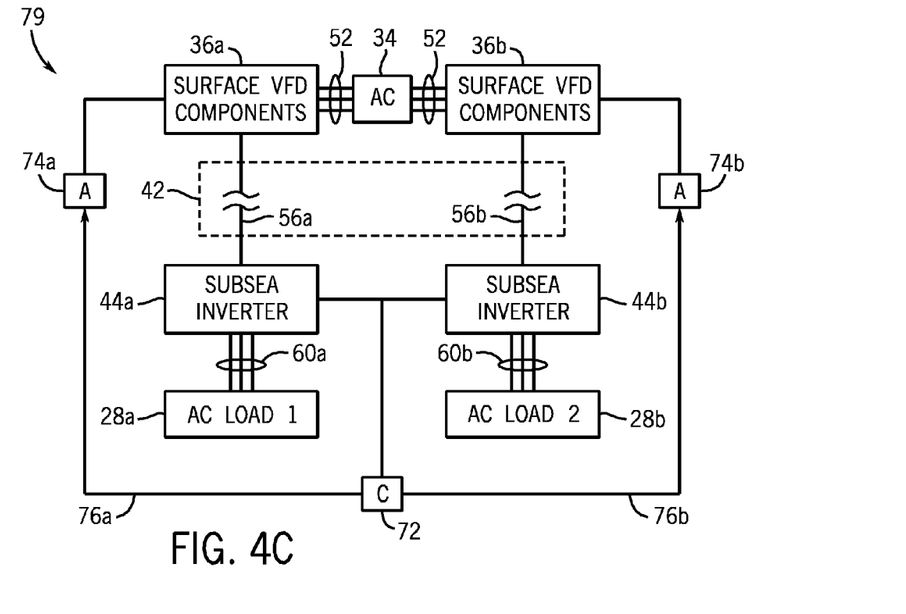

FIGS. 4A-4C each depict further embodiments of circuits that may be used for driving one or more AC powered subsea loads, in accordance with the presently described techniques. Referring first to the circuit 77 shown in FIG. 4A, the AC power source 34 may supply three-phase AC power 52 to the surface components 36 of the variable frequency drive 50. As discussed above, the surface component 36 may include a rectifier 38 for converting the three-phase AC power 52 into DC power. The surface components 36 may further include a DC filter 40 for filtering the DC power output of the rectifier 38 prior to transmitting DC power to the subsea inverter 44.

As discussed above, the transmission of DC power from the DC filter 40 to the subsea inverter 44 may be facilitated by way of the DC power line 56, which may be enclosed within an umbilical cable 42, schematically illustrated here by the dashed line enclosing the DC power line 56. The subsea inverter 44, upon receiving the transmitted the DC power from the DC power line 56, converts the DC power back into three-phase AC power 60, which may then be utilized in order to drive the subsea load 28. Here, rather than utilizing a seawater return path 76 using a cathode 72 and anode 74, as illustrated in FIG. 3, an additional current return line 80 coupling the subsea inverter 44 to the surface components 36 of the variable frequency drive 50 is provided instead, thus completing the circuit. Here, the current return line 80 is also enclosed by the umbilical 42 along with the DC power line 56. That is, the umbilical 42, in the embodiment shown in FIG. 4A, may include a single DC power line 56 for driving a single AC load 28, as well as a single current return line 80.

FIG. 4B illustrates a further embodiment of a circuit 78 that may be utilized for driving multiple AC powered subsea loads, shown here by the reference numbers 28a and 28b. The circuit 78 may include the AC power source 34 for supplying three-phase AC power 52 to the surface components 36 of a variable frequency drive 50. As discussed above, the surface components may include a rectifier 38 for converting the three-phase AC power 52 into DC power, and a DC filter 40 for filtering the DC power output from the rectifier 38. The filtered DC power may be transmitted from the surface components 36 to the subsea inverter 44 by way of the DC power line 56, which may be enclosed by the umbilical 42.

The subsea inverter 44, upon receiving the DC power transmitted via the DC power line 56, converts the DC power into three-phase AC power 60. To drive both of the AC powered subsea loads 28a and 28b, the three-phase AC power 60 output by the subsea inverter 44 may be received by a power distribution system 82. The power distribution system 82 may be configured to supply an appropriate amount of AC power to drive each of the AC loads 28a and 28b. For example, in the illustrated embodiment, the power distribution system 82 may supply three-phase AC power 84 to drive the subsea load 28a and may supply three-phase AC power 86 to drive the subsea load 28b. That is, in the present embodiment, the umbilical 42 may include a single DC power line 56 that transmits DC power which may be utilized by the subsea inverter 44 and power distribution system 82 to drive multiple AC loads 28a and 28b.

While the presently illustrated embodiment depicts only two subsea loads 28a and 28b coupled to the power distribution system 82, it should be understood that depending on the power-delivering capabilities of the power distribution system 82, additional AC powered subsea loads may also be driven using the present configuration. The circuit 78 also utilizes the seawater current return path 76 discussed above with reference to FIG. 3. That is, the cathode 72 may be coupled to the subsea inverter 44 and an anode 74 may be coupled to the surface components 36 to define the seawater current return path 76.

Continuing now to FIG. 4C, a further embodiment of a circuit 79 for driving multiple subsea loads 28a and 28b is illustrated. The circuit 79 essentially includes two variable frequency drives 50 each receiving three-phase AC power 52 from a common AC power source 34. For instance, the AC power source 34 supplies three-phase AC power 52 to the surface components 36a and 36b of respective first and second variable frequency drives. Each of the surface components 36a and 36b may include respective rectifier and filtering components, as generally discussed above. Thus, each of the surface components 36a and 36b may output filtered DC power by way of the respectively coupled DC power lines 56a and 56b.

In the presently illustrated embodiment, the DC power lines 56a and 56b may be enclosed within a single subsea umbilical 42. The DC power transmitted by each of the DC power lines 56a and 56b may be received by the subsea inverters 44a and 44b, respectively. The subsea inverter 44a may convert the DC power transmitted via the DC power line 56a into three-phase AC power 60a for driving the subsea load 28a. Similarly, the subsea inverter 44b may convert the DC power transmitted via the DC power line 56b into three-phase AC power 60b for driving the subsea load 28b. That is, in the circuit 79 shown in FIG. 4C, a subsea umbilical cable 42 may include a DC power line (56a and 56b) for each subsea load (28a and 28b) within the subsea production system 10. Additionally, the subsea inverters 44a and 44b may be coupled to a common cathode 72. The cathode 72 may provide a seawater current return path 76a to the anode 74a coupled to the surface component 36a. The cathode 72 may also provide a seawater current return path 76b to the anode 74b coupled to the surface components 36b.

As can be appreciated, certain aspects of the presently disclosed techniques provide for the transmission of DC power to a subsea inverter 44 by way of a single DC power conductor. As will be discussed further below, the transmission of DC power is typically more efficient relative to the transmission of AC power over equally long step-out distances, such as one hundred or more kilometers. Additionally, an umbilical cable 42 having a single power conductor for powering a subsea AC load is generally smaller, less complex, and thus more cost efficient compared to umbilical arrangements used in conventional subsea productions systems which provide for directly transmitting AC power from a surface variable frequency drive to a subsea load, or from a surface AC power supply to a subsea variable frequency drive. For instance, as discussed above, a conventional umbilical cable for transmitting three-phase AC power may require three separate AC power conducting lines.

Figure 5:
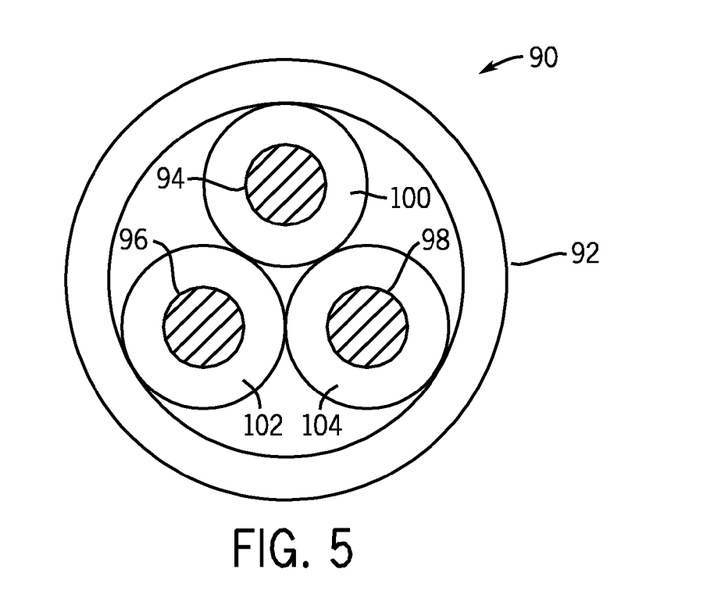
FIG. 5 is a cut-away view of an umbilical cable for transmitting three phase AC power.

Referring now to FIG. 5, a cut-away view of such a three-phase AC power umbilical is illustrated and referred to by the reference number 90. As shown, the umbilical cable 90 may include an outer insulating layer 92. The outer insulating layer 92 may serve to shield, insulate, and enclose three AC power conductors 94, 96, and 98, each configured to transmit the three-phase AC power supplied by a surface power source (not shown). By way of example, the three phase AC power may include AC power corresponding to 15 Hz, 30 Hz, and 60 Hz, respectively. Additionally, each of the AC power conductors 94, 96, and 98 may include respective insulating layers 100, 102, and 104. As discussed above, the size of the AC power conductors 94, 96, and 98 may depend on the transmitted voltages. For example, an AC power line rated for transmitting 10 kilovolts (kV) may be approximately 1 to 1.5 inches in diameter. The AC power line (94, 96, 98) may be copper, aluminum, or any other type of suitable conductive material.

Disadvantageously, where multiple AC power conductors for transmitting three-phase AC power to a subsea variable frequency drive are required, the size of the umbilical 90 is greatly increased, thereby substantially increasing the cost of power transmission in conventional subsea production systems. Further, as mentioned above, the transmission of AC power over long step-out distances may result in potentially undesirable harmonics and reflected waveforms being generated near sensitive subsea equipment, such as a conventional subsea variable frequency drive, a subsea load, trees, and/or wellheads, and/or near the surface (e.g., near the surface vessel).

Accordingly, certain aspects of the presently disclosed techniques provide for a "split" variable frequency drive (e.g., 50) that produces a DC power output at a surface vessel and transmits the DC power directly to a subsea inverter (e.g., 44), which then converts the DC power back into AC power for driving a subsea AC powered load, such as a pump, compressor, or motor, for example. The transmission of the DC power may be facilitated by way of an umbilical cable (e.g., 42) having a single DC power conductor. This greatly reduces the size of the umbilical cable and thus the cost of powering subsea equipment relative to conventional subsea production systems, such as those utilizing the three-phase AC umbilical 90 of FIG. 5 for driving AC powered subsea equipment. Additionally, because the subsea variable frequency inverter 44 is located relatively near the subsea AC load 28, AC power transmitted from the subsea inverter 44 to the load 28 is transmitted over a relatively short distance and, therefore, potentially undesirable harmonics and reflective waveforms typically associated with transmission of AC power over long distances is reduced or eliminated altogether.

Before continuing, it should be noted that in accordance with a further aspect of the present disclosure, an existing three-phase AC umbilical 90 may be retrofitted for use with one or more split variable frequency drives 50. For instance, the three power conductors within the umbilical 90 may be retrofitted to couple to one or more surface DC sources, such as the rectifier 38 and DC filter 40. For instance, the conductors 94, 96, and 98 may be retrofitted to each receive the DC power output of a respective surface DC filter component 40. Each of the power conductors 94, 96, and 98 may further be retrofitted to couple to respective subsea inverters 44 and be configured to transmit DC power output to each respective subsea inverter 44. In other words, where a subsea production system or mineral extraction system already has a three-phase AC power umbilical 90 in place, one or more split variable frequency drives 50 be provided to replace conventional variable frequency drives which may be located entirely subsea or entirely on the surface vessel, as discussed above. Then, using the existing three conductors in the umbilical 90, DC power may be transmitted to as many as three subsea inverter units 44 in a manner similar to the embodiment shown in FIG. 4C.

Figure 6A:
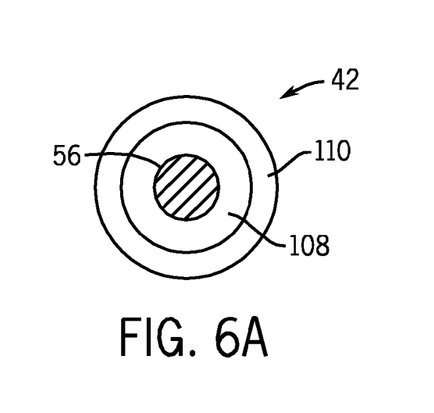
FIGS. 6A-6D are cut-away views of an umbilical cable configured to transmit DC power to a subsea inverter, in accordance with several embodiments of the present invention.

Referring now to FIG. 6A, an embodiment of an umbilical cable 42, in accordance with aspects of the present technique, is shown by way of a cut-away view. The umbilical cable 42 may be utilized in the subsea production system 10 shown in FIG. 1 and may include the DC power line 56. As discussed above, the DC power line 56 may be configured to transmit DC power output from the DC filter 40 to the subsea inverter 44. The subsea inverter 44 may then convert the DC power transmitted via the DC power line 56 into AC power (e.g., 60) which may be utilized to drive one or more AC powered subsea loads (e.g., 28). Further, as mentioned above, a DC power line 56 rated to transmitted a particular voltage is typically smaller than a similarly rated AC power line. For example, if the DC power line 56 is rated for transmitting 10 kV, the DC power line 56 may be approximately 0.5 to 0.75 inches in diameter and may also require less insulation relative to a comparable AC power line, such as the AC power lines 94, 96, and 98 shown in FIG. 5. In the illustrated embodiment, the DC power line 56 may be enclosed within an insulating layer 108. Both the DC power line 56 and its corresponding insulating layer 108 may be enclosed in the outer insulating layer 110 of the umbilical 42. In another embodiment, the insulating layer 108 may not be present and, instead, the DC power line 56 may be insulated solely by the outer insulating layer 110 of the umbilical cable 42. Like the AC power lines 94, 96, and 98 discussed above, the DC power line 56 may include copper, aluminum, or any other type of suitable conductive material.

Figure 6B:
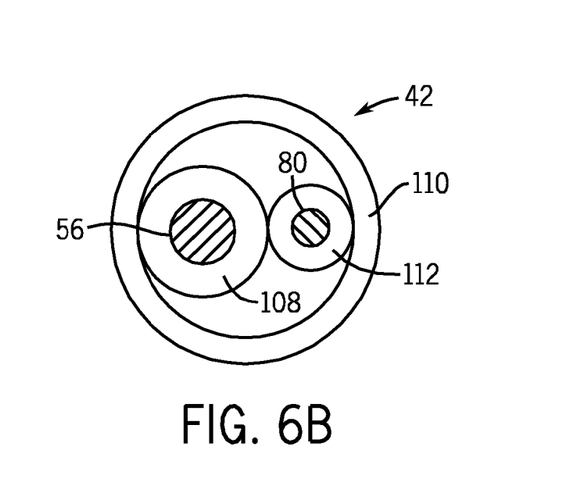

FIG. 6B shows a cut-away view illustrating an alternate embodiment of the umbilical 42. Particularly, FIG. 6B illustrates an umbilical 42 that may be utilized in the circuit 77 described above with reference to FIG. 4A. For instance, the umbilical 42 may include the DC power line 56 and the current return line 80. Each of the DC power line 56 and the current return line 80 may include respective insulating layers 108 and 112. The DC power line 56, the current return line 80, and their respective insulating layers 108 and 112, may all be enclosed by the outer insulating layer 110 of the umbilical 42.

Figure 6C:
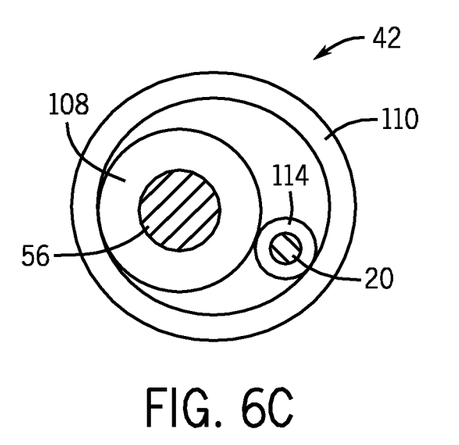

FIG. 6C illustrates a further embodiment in which a DC power line 56 and a control line 20, as discussed above in FIG. 1, are enclosed within the umbilical 42. As mentioned above, the control line 20 may provide for the transmission of control signals to a subsea controller or control module 18 which may be utilized for controlling a number of subsea components, such as the Christmas trees 16 and the subsea inverter 44. Particularly, control of the subsea inverter 44 by the controller 18 may provide for adjustable control of the subsea AC load 28. For example, where the subsea AC load 28 is a three-phase AC induction motor, the motor may be started slowly and gradually ramped up to a desired operational speed. Further, it should be appreciated that the control line is typically configured for transmitting voltages that are substantially lower than those transmitted by the DC power line 56. For example, the control line 20 may transmit voltages at approximately 10-30 volts DC. In one embodiment, the control line 20 may transmit voltages of approximately 24 volts DC. In contrast, the DC power line may be configured to transmit voltages in the order of hundreds of volts or even kilovolts, such as approximately 10 kilovolts. As shown, each of the DC power line 56 and the control line 20 may be enclosed by respective insulating layers 108 and 114, and may be further enclosed by the outer insulating layer 110 of the umbilical 42. The control line 20 may include copper, aluminum, or fiber optic cable, for example. Further, though not shown in the present embodiment, it should be understood that the umbilical 42 may also include additional non-electrical lines, such as hydraulic lines and chemical lines. For instance, disclosed embodiments of the umbilical shown in FIG. 6C may include any number of DC power lines, return lines, hydraulic lines, control lines, chemical injection lines, etc. For instance, embodiments of the umbilical 42 may provide for 1, 2, 3, 4, 5, 6, 7, 8, 9, 10 or more each of DC power lines, return lines, hydraulic lines, control lines, or chemical injection lines, or some combination thereof.

Figure 6D:
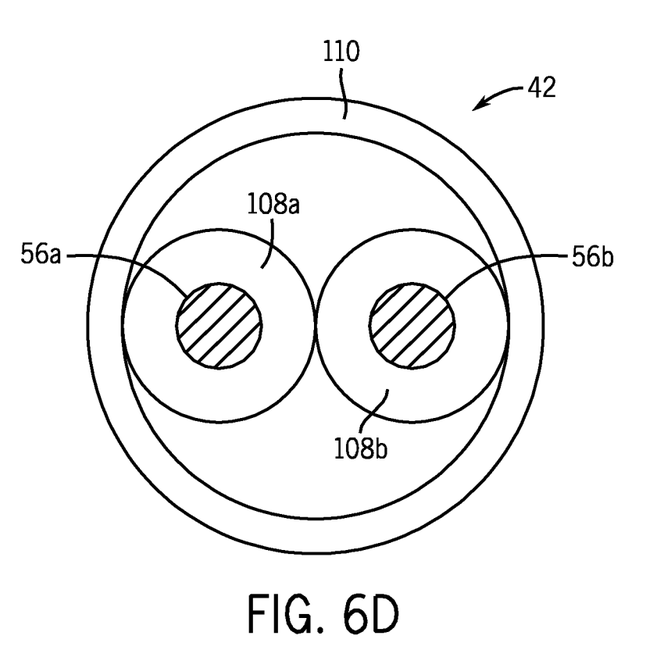

FIG. 6D illustrates yet a further embodiment of an umbilical configuration 42, in accordance with aspects of the present technique. In particularly, the umbilical 42 shown in FIG. 6D may be utilized in the circuit 79 depicted in FIG. 4C. The illustrated umbilical 42 includes the outer insulating layer 110, which may enclose the power lines 56a and 56b. Each of the DC power lines 56a and 56b may include corresponding insulating layers 108a and 108b. As described above with reference to FIG. 4C, the power lines 56a and 56b may be configured to transmit DC power from respective surface components 36a and 36b. The surface components 36a and 36b may be part of first and second variable frequency drives, respectively. The DC power transmitted via the power lines 56a and 56b may be received by the subsea inverters 44a and 44b, respectively, and converted into AC power for driving respective subsea loads 28a and 28b. Thus, the embodiment shown by FIG. 6D is meant to illustrate an implementation in which an umbilical 42 includes one DC power line for each AC powered subsea load in a subsea production system 10.

As mentioned above, one benefit of the present disclosure relates to the higher transmission efficiency of DC power when compared to the transmission of AC power. Particularly, the transmission of AC power generally decreases in efficiency as the transmission distance increases. Thus, in subsea applications where power is delivered over relatively long step-out distances, such as hundreds of kilometers, the transmission of AC power is often disadvantaged with high percentages of line loss.

In contrast, DC power transmission is generally more efficient due to the lack of complex impedances associated with transmitting AC power and, particularly, multi-phase AC power. For example, referring now to FIG. 7, a graph 120 comparing the efficiency of DC power transmission compared to AC power transmission at comparable voltages is illustrated. Referring first to the curves 122, 124, and 126, these curves may represent the transmission efficiency of three-phase AC power transmitted at 15 Hz, 30 Hz, and 60 Hz, respectively, over a step-out range from 0 to 700 kilometers (e.g., the x-axis of graph 120) from a main surface AC power source (e.g., source 34 on surface vessel 12). As discussed above, lowering the frequency of the AC power may marginally improve the transmission efficiency to some degree. For instance, as shown in the graph 120, the transmission of AC power at 15 Hz (curve 122) is more efficient relative to the transmission of AC power at 30 Hz (curve 124) and 60 Hz (curve 126). However, when compared to the transmission of DC power (curve 128) at a comparable voltage, the transmission efficiency (e.g., the y-axis of graph 120) for each of the AC power curves 122, 124, and 126 reduces significantly as the step-out distance from a surface AC power source 34 increases. For example, between step-out distances of approximately 100 to 300 kilometers, the transmission efficiency for three-phase AC power is reduced to approximately 60 percent or less. Further, at a step-out distance of approximately 500 kilometers, the transmission efficiency of AC power is further reduced to less than 20 percent.

Figure 7:
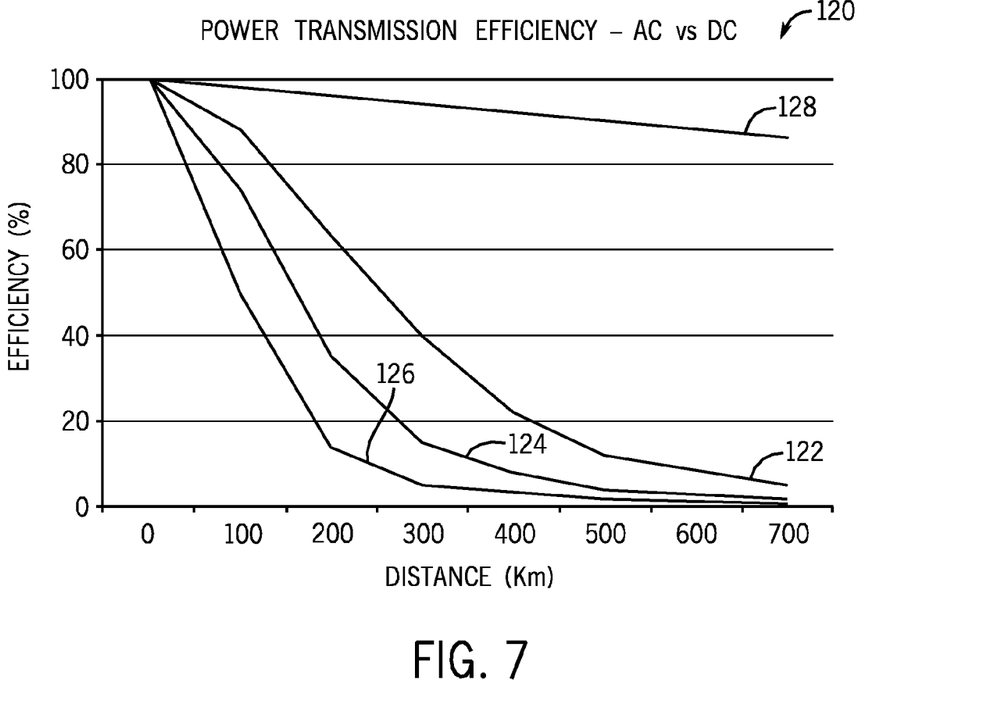
FIG. 7 is a graph comparing the efficiency of transmitting AC power and the efficiency of transmitting DC power at a comparable voltage over various step-out distances.

In comparison, the transmission of DC power at a comparable voltage, as represented by the curve 128, is much more efficient than AC power transmission, even at long step-out distances. For example, as shown by the curve 128, at a step-out distance of approximately 300 kilometers, the transmission efficiency of DC power is still greater than at least 90 percent. At a step-out distance of approximately 700 kilometers, the transmission efficiency of DC power does slightly decrease, but still remains relatively high at approximately 85-90 percent efficiency when compared to the AC power curves 122, 124, and 126, which may transmit only at approximately 10 percent efficiency at the same distance. Thus, in order to drive a similar AC powered subsea load at the same step-out distance, substantially more AC power would need to be transmitted in order to compensate for the inefficiencies and line losses that may occur during AC transmission.

As discussed above, the presently disclosed techniques may offer several advantages over conventional subsea production applications. For instance, by utilizing a split variable frequency drive in which DC power is generated on a surface vessel and transmitted to a subsea inverter, power transmission is generally much more efficient relative to transmitting AC power from a surface AC power source to a subsea variable frequency drive (e.g., having rectifying, filtering, and inverter components all located subsea) or from a surface variable frequency drive to a subsea load (e.g., having rectifying, filtering, and inverter components all located on the surface). Further, as mentioned above, umbilical cables for transmitting DC power subsea are typically smaller and more cost efficient relative to conventional umbilical cables for transmitting AC power subsea to drive an AC powered load. For instance, a single DC power line may replace three separate AC conductors required for transmitting three-phase AC power in conventional umbilical cables. Further, because the subsea variable frequency inverter (e.g. 44) is located relatively near the AC powered subsea load (e.g., 28), AC power transmitted from the subsea inverter to the load is transmitted over a relatively short distance, thereby reducing or eliminating potentially undesirable harmonics and reflective waveforms typically associated with transmission of AC power over long distances. Additionally, because only the inverter component of a split variable frequency drive is located subsea, the number of subsea electronic components is reduced. As will be appreciated, this may advantageously provide for reduced heat output from subsea electronics used in a subsea production system, as well as streamline retrieval, maintenance, servicing, and/or repair of such equipment.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a subsea inverter configured to be located at a subsea location and configured to receive DC power transmitted from a surface vessel of the system, wherein the subsea inverter is configured to convert the DC power into AC power to drive one or more subsea loads; and
a cathode configured to be located subsea and coupled to the subsea inverter, wherein the cathode is configured to define a current return path through water to an anode coupled to a surface component on the surface vessel.

2. The system of claim 1, wherein the one or more subsea loads comprises one of a pump, a compressor, a motor, an induction motor, a multiphase pump motor, a raw seawater injection pump motor, a separation system pump motor, or some combination thereof.

3. The system of claim 1, wherein the one or more subsea loads comprises a plurality of subsea loads, and wherein the system comprises a power distribution system configured to receive the AC power from the subsea inverter and to distribute the AC power to drive each of the plurality of subsea loads.

4. The system of claim 1, comprising:
an AC power source configured to be located on the surface vessel; and
a rectifier configured to be located on the surface vessel;
wherein the AC power source is configured to supply AC power to the rectifier, and wherein the rectifier is configured to convert the AC power into the DC power.

5. The system of claim 4, wherein the DC power converted by the rectifier is first filtered at the surface vessel using a DC filter prior to transmitting the DC power to the subsea inverter at the subsea location.

6. The system of claim 5, wherein the anode is coupled to one of the rectifier or the DC filter on the surface vessel.

7. The system of claim 4, wherein the AC power source supplies three-phase AC power.

8. The system of claim 1, wherein approximately 7 to 10 kilovolts is transmitted to the subsea inverter, and wherein the subsea inverter converts the DC power into approximately 2-5 megawatts of AC power for driving the one or more subsea loads.

9. The system of claim 1, wherein the subsea inverter is enclosed within a subsea enclosure comprising an interface to facilitate subsea retrieval of the subsea inverter.

10. The system of claim 1, wherein the system comprises a subsea production system.

11. The system of claim 1, wherein the subsea inverter is communicatively coupled to a subsea control module configured to control the frequency of the AC power supplied by the subsea inverter for driving the one or more subsea loads.

12. A method, comprising:
receiving AC power into a rectifier circuit using an AC power source located on a surface vessel;
converting the supplied AC power into DC power using the rectifier circuit located on the surface vessel;
transmitting the DC power to an inverter located at a subsea location remote from the surface vessel, wherein the inverter is configured to convert the transmitted DC power into AC power for driving one or more subsea loads; and
creating a current return path through water between the inverter and the rectifier circuit using a cathode and anode disposed subsea.

13. The method of claim 12, comprising filtering the DC power using a DC filter located on the surface vessel prior to transmitting the DC power to the inverter at a subsea location.

14. The method of claim 12, wherein transmitting the DC power comprises transmitting a voltage within a range of approximately 1 kilovolt to 10 kilovolts.

15. The method of claim 12, wherein the DC power is transmitted to the inverter using a DC conductor enclosed within an umbilical.

* * * * *